United States Patent
Hsu

(10) Patent No.: US 6,168,643 B1
(45) Date of Patent: *Jan. 2, 2001

(54) INORGANIC PHOSPHORUS FERTILIZER

(75) Inventor: Hsinhung John Hsu, Ventura, CA (US)

(73) Assignee: Safergro Laboratories, Inc., Ventura, CA (US)

(*) Notice: Under 35 U.S.C. 154(b), the term of this patent shall be extended for 0 days.

This patent is subject to a terminal disclaimer.

(21) Appl. No.: 09/241,846

(22) Filed: Feb. 1, 1999

Related U.S. Application Data

(63) Continuation of application No. 08/958,644, filed on Oct. 27, 1997, now Pat. No. 5,865,870, which is a continuation-in-part of application No. 08/788,860, filed on Jan. 23, 1997, now Pat. No. 5,707,418.

(30) Foreign Application Priority Data

Oct. 22, 1998 (AU) .................................................. 51590/98

(51) Int. Cl.$^7$ ................................. C05B 9/00; C05B 7/00
(52) U.S. Cl. ........................ 71/32; 71/33; 71/34; 71/64.1
(58) Field of Search ................................... 71/32, 33, 34, 71/64.1

(56) References Cited

U.S. PATENT DOCUMENTS

| 4,336,053 | * | 6/1982 | Kenton | 71/40 |
| 5,514,200 | * | 5/1996 | Lovatt | 71/11 |
| 5,707,418 | * | 1/1998 | Hsu | 71/32 |
| 5,736,164 |   | 4/1998 | Taylor . | |
| 5,800,837 |   | 9/1998 | Taylor . | |
| 5,865,870 | * | 2/1999 | Hsu | 71/32 |

* cited by examiner

*Primary Examiner*—Wayne Langel
(74) *Attorney, Agent, or Firm*—Gene W. Arant; Ralph D. Chabot

(57) ABSTRACT

Concentrated phosphorus fertilizers of the phosphorous variety are described which are absorbed quickly into plant systems and improve plant growth. Particularly described are fertilizers having a combination of phosphorous acid or its salts thereof, and either (a) polyphosphoric acid and its salts thereof; or (b) phosphoric acid and its salts thereof. This combination phosphorus fertilizer, when combined within a specific ratio range, increases phosphorus uptake to plants thereby enhancing plant growth.

13 Claims, No Drawings

INORGANIC PHOSPHORUS FERTILIZER

This is a continuation of prior application Ser. No. 08/958,644 filed Oct. 27, 1997, U.S. Pat. No. 5,865,870, which is a continuation-in-part of prior application Ser. No. 08/788,860, filed Jan. 23, 1997 and issued as U.S. Pat. No. 5,707,418 on Jan. 13, 1998.

BACKGROUND

This invention relates to phosphorus fertilizers and their method of preparation. In particular, this invention relates to a fertilizer having a combination of phosphorous acid or its salts thereof, and either (a) polyphosphoric acid and its salts thereof; or (b) phosphoric acid and its salts thereof. This combination phosphorus fertilizer, when combined within a specific ratio range, reduces the risk of formation of phosphorus or calcium phosphate precipitates. It further increases the phosphorus uptake to plants and thereafter can be oxidized into a form more readily useable by a plant system.

Fertilizers have long been used to supply needed nutrition to plants. The principle components of plant fertilizers have centered on three elements: nitrogen, phosphorus and potassium.

Phosphorus is not found in nature in its elemental form. The principal source of phosphorus for the fertilizer industry, however, is obtained from the ores of phosphorus containing minerals. The usual practice in the fertilizer industry is to convert phosphorus ores into a phosphorus product containing the phosphoric radical ($PO_4^{-3}$) which can be absorbed, although rather inefficiently, into plants and thereafter used as nutrition. It is well known in the prior art that phosphorus is biologically active and nutritionally useful to plants only in the phosphoric form ($PO_4^{-3}$). A common source of the phosphoric radical ($PO_4^{-3}$) for fertilizers is phosphoric acid.

Many of the phosphorus fertilizers currently used have a number of undesired qualities. First, if prepared in concentrated solutions, they tend to form undesired precipitates in a short period of time. Further, these concentrated solutions must be maintained within a narrow pH range to prevent precipitation, which results in fertilizers with limited application. Precipitates are undesirable since they can not be absorbed by plants.

Still another problem with phosphorus containing fertilizers, particularly phosphoric fertilizers, is that they are not readily absorbed by foliage and must be applied to the soil and thereafter absorbed by the plant root system. Since only a small portion of the phosphoric fertilizer applied to the soil is actually absorbed by a root system, frequent reapplication usually occurs. This is undesirable because it can lead to leaching of phosphate into the groundwater which may cause eutrophication of lakes, ponds and streams.

Prior art formulas of phosphorus fertilizers have identified these problems. U.S. Pat. No. 5,514,200, issued to Lovatt, describes a formula utilizing the more readily absorbed phosphorous form ($PO_3^{-3}$) in a composition buffered with an organic acid. However, as is discussed below, the present invention represents an improved and more effective composition for providing phosphorus to plants.

SUMMARY

The present invention is directed to a concentrated phosphorus fertilizer solution which consists essentially of phosphorous acid or its salts dissolved in water and stabilized with an inorganic complexing agent such as polyphosphoric acid to prevent phosphorus or calcium phosphate precipitation. Reduction of the formation of phosphorus or calcium phosphate precipitates, allows the concentrated phosphorus fertilizer to be stored for long periods of time. When subsequently diluted, the fertilizer can be applied to plants and/or soil, being easily absorbed through the foliage or the root system of a plant. The absorbed phosphorus is then used by plants to perform or accelerate biological functions which are defined here to include plant growth, improved quality, improved disease resistence, and improved vigor.

Although the present invention can function properly and remain dissolved in solution in the range of pH between 0.5 and 10.0, it is preferably maintained in a pH range between 5.0 and 7.5 for ideal absorption into plants either by foliar or soil applications.

Testing, the results of which are provided below, indicate that phosphorous acid or its salts, in combination with either (a) polyphosphoric acid or its salts, or (b) phosphoric acid or its salts, when used as a plant fertilizer, has a synergistic effect which improves plant growth than if phosphorous, polyphosphoric or phosphoric fertilizers were used individually on plant systems.

The desired weight ratio of phosphorus derived from phosphorous acid or its salts to phosphorus derived from either (a) polyphosphoric acid or its salts, or (b) phosphoric acid or its salts, is between 1:10 to 10:1. However, the range can be from 1:20 to 20:1. Alternatively, (a) and (b) described above may be combined so that the weight ratio to phosphorous acid or its salts is between 1:20 to 20:1.

Other features and advantages will become apparent to those skilled in the art upon review of the following detailed description and claims.

DESCRIPTION

A phosphorus fertilizer is prepared by mixing phosphorous acid or its salts with either: phosphoric acid or its salts; or, polyphosphoric acid or its salts. The phosphorus derived from phosphoric acid or its salts or polyphosphoric acid or its salts is designated as $PO_4^{-3}$ and phosphorus derived from phosphorous acid or its salts is designated as $PO_3^{-3}$. The ratio of $PO_4^{-3}$ to $PO_3^{-3}$ in the prepared phosphorus fertilizer ranges from 1:20 to 20:1. Mixing of $PO_4^{-3}$ with $PO_3^{-3}$ produces a synergistic effect of $PO_4^{-3}$ and $PO_3^{-3}$ on plant growth and uptake of phosphorus by plants.

Mixing of $PO_4^{-3}$ and $PO_3^{-3}$ also enables the preparation of high phosphorus liquid fertilizers with better stability and little, if any precipitation. However, although liquid preparations are more desirable, dry preparations are also possible.

To prepare the fertilizer of the present invention, phosphorous acid or its salts, $PO_3^{-3}$ are dissolved in water. The solution is then stabilized by adding $PO_4^{-3}$, added in intervals, until the $PO_4^{-3}$ constitutes within the range 1:20 to 20:1 by weight relative to the amount of $PO_3^{-3}$ present.

The novel composition can be delivered to plants by foliar or soil applications such as through an irrigation system. The phosphorus fertilizers so prepared are taken up by plants in the phosphorous form and are gradually converted by enzymes in the plants to phosphoric form to perform or accelerate biological functions in the plant.

Phosphorous acid is a genus which includes the following species: phosphorous acid, hypophosphorous acid, polyphosphorous acid, polyhypophosphorous acid.

Salts of phosphorous acid contemplated by this invention include but are not limited to ammonium phosphite, calcium phosphite, magnesium phosphite, manganese phosphite, potassium phosphite, sodium phosphite, and zinc phosphite.

Phosphoric acid exists in the meta ($HPO_3$), pyro ($H_4P_2O_7$) and ortho ($H_3PO_4$) form.

Salts of phosphoric acid contemplated by this invention include but are not limited to ammonium phosphate, calcium phosphate, ferrous phosphate, aluminum phosphate, ferric phosphate, magnesium phosphate, manganese phosphate, sodium phosphate, and zinc phosphate.

Polyphosphoric acid is a genus which includes the following species: polyphosphoric acid, dipolyphosphoric acid, tripolyphosphoric acid, tetra polyphosphoric acid, penta polyphosphoric acid, hexapolyphosphoric acid or combinations thereof.

Salts of polyphosphoric acid include but are not limited to potassium polyphosphate, ammonium polyphosphate, sodium polyphosphate, zinc polyphosphate, magnesium polyphosphate and iron polyphosphate.

The desired pH range is between 5.0 and 7.5. However, the pH can be from 0.5 to 10.0.

In order to more clearly define the invention, the following examples of methods of preparation are set forth. These examples are illustrative only and are not limiting as to the scope of the invention.

Examples I and VII are typical fertilizer found in the prior art. Examples II and VIII embody the present invention with regards to phosphorous acid and an inorganic complexing agent. Examples III and IX are also prior art formulations embodying formulations of the Lovatt U.S. Pat. No. 5,514,200 which utilize phosphorous acid buffered with an organic acid. Examples IV, V and VI set forth alternative compositions of matter embodying the concept of the present invention.

Examples X, XI, XIII, XV, XVI, XIX, XX and XXI are typical of fertilizers found in the prior art. Examples XII, XIV, XVII, XVIII, XXII, and XXIII are also embodiments of the present invention.

EXAMPLE I (PRIOR ART)

A 0-28-25 fertilizer was prepared by mixing the following:

(1) 376 grams water
(2) 299 grams potassium hydroxide
(3) 325 grams phosphorous acid The fertilizer had a pH of approximately 6.2 with a resulting appearance that was cloudy. The solution was analyzed to contain 25.9% $P_2O_5$ and 25.2% $K_2O$.

EXAMPLE II

A 0-28-25 fertilizer was prepared by mixing the following:

(1) 366 grams water
(2) 299 grams potassium hydroxide
(3) 315 grams phosphorous acid
(4) 10 grams polyphosphoric acid The fertilizer had a pH of approximately 6.2 with a resulting appearance that was clear and was analyzed to contain 28.1% $P_2O_5$ and 24.9% $K_2O$.

EXAMPLE III (U.S. Pat. No. 5,514,200)

A 0-28-25 fertilizer was prepared by mixing the following:

(1) 356 grams water
(2) 299 grams potassium hydroxide
(3) 325 grams phosphorous acid
(4) 20 grams citric acid The resulting appearance was clear with some precipitation. The solution was analyzed to contain 26.2% $P_2O_5$ and 24.7% $K_2O$.

In comparing Examples I, II, and III, the results indicate that the composition embodying the invention, Example II, results in over 10% additional $P_2O_5$ in solution than either the prior art or the recent patented formulation according to Lovatt.

Experiment 1

The 3 fertilizer samples prepared as Examples I, II, and III were diluted with water at a ratio of concentrate to water of 1:250. The solutions were then sprayed on tomato plants at 5 mililiters per each plant. Four different plants were sprayed with each solution. One week after the application of the solution, the twelve plants were cut at soil level, washed with dilute acid and water and then dried in an oven at 75° C. for 24 hours. The dried plants were then analyzed for total phosphorus and potassium. The analysis results are as follows:

DRIED PLANT ANALYSIS

|  | Example I Prior art | Example II invention | Example III Lovatt patent |
| --- | --- | --- | --- |
| Total P (%) | 0.69 | 0.82 | 0.69 |
| Total K (%) | 1.90 | 1.91 | 1.79 |

The results of Experiment 1 indicate that the composition of Example II provides an improved rate of absorption of phosphorus into a plant 18.18% better when compared with the prior art or a comparable formula as taught by Lovatt without affecting the potassium uptake.

Experiment 2

Experiment 1 was repeated upon bush bean plants rather than tomato plants. The analysis results are as follows:

DRIED PLANT ANALYSIS

|  | Example I Prior art | Example II Invention | Example III Lovatt patent |
| --- | --- | --- | --- |
| Total P (%) | 0.26 | 0.31 | 0.27 |
| Total K (%) | 1.73 | 1.80 | 1.78 |

The results indicate that the novel composition of Example II provides an improved rate of absorption of phosphorus (19.2% improvement) into a bush bean plant when compared to the prior art or a comparable formula according to Lovatt (4% improvement).

EXAMPLE IV

A 4-25-15 fertilizer was prepared by mixing the following:
(1) 438 grams water
(2) 180 grams potassium hydroxide
(3) 285 grams phosphorous acid
(4) 87 grams urea
(5) After all the materials were dissolved, 10 grams of ammonium polyphosphate was added.

The resulting fertilizer had a pH of 5.9 and analyzed to obtain 4.1% N, 25.2% $P_2O_5$ and 14.9% $K_2O$.

EXAMPLE V

A 0-40-0 fertilizer was prepared by mixing the following:
(1) 534 grams water
(2) 463 grams phosphorous acid
(3) 3 grams tripolyphosphate The fertilizer had a pH of 0.5 and was clear in appearance. This fertilizer can be further diluted with water at ratios of concentrate to water up to 1:10,000 and used as soil application or with irrigation water.

EXAMPLE VI

A 0-27-25 fertilizer was prepared by mixing the following:
(1) 308 grams water
(2) 307 grams phosphorous acid
(3) 365 potassium carbonate
(4) 20 grams potassium polyphosphate The pH was approximately 6.2 and the fertilizer was observed to remain in solution for 30 days without formation of precipitate.

EXAMPLE VII (PRIOR ART)

A 4-25-15 fertilizer was prepared by mixing the following:
(1) 448 grams water
(2) 180 grams potassium hydroxide
(3) 285 grams phosphorous acid
(4) 87 grams urea The fertilizer had a pH of approximately 5.8 and was analyzed to contain 4.1% N, 24.8% $P_2O_5$ and 15.3% $K_2O$.

EXAMPLE VIII

A 4-25-15 fertilizer was prepared by mixing the following:
(1) 448 grams water
(2) 180 grams potassium hydroxide
(3) 275 grams phosphorous acid
(4) 87 grams urea
(5) 10 grams polyphosphoric acid The fertilizer had a pH of approximately 5.9 and was analyzed to contain 4.1% N, 25.2% $P_2O_5$ and 15.1% $K_2O$.

EXAMPLE IX (U.S. Pat. No. 5,514,200)

A 4-25-15 fertilizer was prepared by mixing the following:
(1) 428 grams water
(2) 180 grams potassium hydroxide
(3) 285 grams phosphorous acid
(4) 87 grams urea
(5) 20 grams citric acid The fertilizer had a pH of approximately 5.1 and was analyzed to contain 4.1% N, 24.6% $P_2O_5$ and 15.0% $K_2O$.

Experiment 3

Samples from Examples VII, VIII, and IX were diluted 250 to 1 with water and then sprayed on tomato plants at 5 milliliters per plant. Four different plants were sprayed with each solution. One week after the application of the solution, the twelve plants were cut at soil level, washed with dilute acid and water and then dried in an oven at 75 degrees C for 24 hours. The dried plants were then analyzed for nitrogen, phosphorus and potassium. The analysis results are as follows:

DRIED PLANT ANALYSIS

|  | Example VII Prior art | Example VIII Invention | Example IX Lovatt patent |
| --- | --- | --- | --- |
| Total N (%) | 3.9 | 3.9 | 3.6 |
| Total P (%) | 0.41 | 0.49 | 0.40 |
| Total K (%) | 2.82 | 2.95 | 2.93 |

As in Experiments 1 and 2, the fertilizer embodying the invention increased the plant's phosphorus intake by about 20% when compared to examples of the prior art.

EXAMPLE X (PRIOR ART)

A 0-40-0 fertilizer was prepared by mixing the following:
(1) 535 grams water
(2) 465 grams phosphorous acid

EXAMPLE XI (PRIOR ART)

A 0-40-0 fertilizer was prepared by mixing the following:
(1) 518 grams water
(2) 482 grams polyphosphoric acid

EXAMPLE XII

A 0-40-0 fertilizer was prepared by mixing the following:
(1) 526.5 grams water
(2) 232.5 grams phosphorous acid
(3) 241 grams polyphosphoric acid

EXAMPLE XIII (PRIOR ART)

A 0-40-0 fertilizer was prepared by mixing the following:
(1) 444 grams water
(2) 556 grams phosphoric acid

EXAMPLE XIV

A 0-40-0 fertilizer was prepared by mixing the following:
(1) 489.5 grams water
(2) 232.5 grams phosphorous acid
(3) 278 grams phosphoric acid In concentrated form, the fertilizer described in either Example III or V had a pH of 0.5 and was clear in appearance. Further, the fertilizers described in either Example III or V can be further diluted with water at ratios of concentrate to water up to 1:10,000 and used as soil application, with irrigation water or directly applied to the plant foilage.

Experiment 4—Dried Plant Analysis

The five fertilizer samples prepared as Examples X through XIV were diluted with water at a ratio of concentrate to water of 1:10,000. Each fertilizer solution was then applied as drench to separate pots each containing one tomato plant standing from 15–20 centimeters in height. Four plants were treated with each solution. Each plant received 500 milliliters of solution. Four plants were also used as a reference and received no fertilizer. Each pot also received 250 milliliters of water, twice per day. Each plant received its respective solution (500 ml) 5 separate times with 2 day intervals between each application. Forty five days after the first application of the solutions, the plants were cut at soil level, washed with dilute acid and distilled water and then dried in an oven at 75° C. for 24 hours. The dried plants were then weighted for dry matter and then analyzed for total phosphorus. The analysis results are as follows:

EXPERIMENT 4—DRIED PLANT ANALYSIS

|  | Ex. X Prior art | Ex. XI Prior art | Ex. XII | Ex. XIII Prior art | Ex. XIV | Water Only |
|---|---|---|---|---|---|---|
| Dry Matter (g/plant) | 21.6 | 22.9 | 25.1 | 23.2 | 26.4 | 20.8 |
| Total P (%) | 0.42 | 0.43 | 0.45 | 0.45 | 0.48 | 0.35 |
| Total P (g/plant) | .091 | .098 | .113 | .104 | .127 | .073 |

The novel fertilizer solution of Example XII contains phosphorus fertilizers present in Examples X and XI. The combination of polyphosphoric acid and phosphorous acid of Example XII showed a 24.2% increase in the percent of phosphorus uptake and a 16.2% increase in dry matter over Example X. Similarly, Example XII showed a 15.3% increase in the percent of phosphorus uptake and a 9.6% increase in dry matter over Example XI.

The novel fertilizer solution of Example XIV contains phosphorus fertilizers present in Examples X and XIII. The combination of phosphoric acid and phosphorous acid of Example XIV showed a 40.0% increase in the percent of phosphorus uptake and a 22.2% increase in dry matter over Example X. Similarly, Example XIV showed a 22.1% increase in the percent of phosphorus uptake and a 13.8% increase in dry matter over Example XIII.

The test results indicate improved phosphorus uptake and increased plant mass by use of a combination phosphorus fertilizer; particularly the phosphorous acid/phosphoric acid combination of Example XIV.

EXAMPLE XV (PRIOR ART)

A 0-15-14 fertilizer having a pH of 6.7 was prepared by mixing the following:

(1) 657 grams water
(2) 175 grams phosphorous acid
(3) 168 potassium hydroxide

EXAMPLE XVI (PRIOR ART)

A 0-15-14 fertilizer having a pH of 6.3 was prepared by mixing the following:

(1) 623 grams water
(2) 209 grams phosphoric acid
(3) 168 grams potassium hydroxide

EXAMPLE XVII

A 0-15-14 fertilizer having a pH of 6.5 was prepared by mixing the following:

(1) 640 grams water
(2) 87.5 grams phosphorous acid
(3) 104.5 grams phosphoric acid
(4) 168 grams potassium hydroxide

EXAMPLE XVIII

A 0-15-14 fertilizer having a pH of 6.5 was prepared by mixing the following:

(1) 640 grams water
(2) 83 grams phosphorous acid
(3) 99 grams phosphoric acid
(4) 10 grams polyphosphoric acid
(5) 168 grams potassium hydroxide Experiment 5—Stability Test Examples XV, XVI, XVII and XVIII were analyzed immediately after preparation. The results are shown in the following table. After the initial analysis, the samples were placed in containers and tightly covered with lids. After standing at room temperature for 48 hours, each sample was first visually observed for the presence of precipitates and thereafter filtered. The filtrates from each sample were analyzed for total phosphorus and potassium. The observations and analysis results are as follows:

EXPERIMENT 5—STABILITY TEST RESULTS

|  | Ex. XV Prior Art | Ex. XVI Prior Art | Ex. XVII | Ex. XVIII |
|---|---|---|---|---|
| Analysis Results at Preparation |  |  |  |  |
| $P_2O_5$ (%) | 15.2 | 14.9 | 15.1 | 15.0 |
| $K_2O$ (%) | 14.0 | 13.7 | 14.3 | 14.1 |
| Appearance after 48 hours | Clear | Precipitation | Clear | Clear |
| Analysis Results after 48 hours |  |  |  |  |
| $P_2O_5$ (%) | 15.1 | 12.1 | 15.2 | 15.0 |
| $K_2O$ (%) | 14.0 | 12.7 | 14.2 | 14.0 |

The test results indicate that the novel phosphorus combination of Examples XVII and XVIII maintain phosphorus and potassium in solution. Also apparent is that phosphoric acid, when used in combination with phosphorous acid as in Example XVII, or when used in combination with phosphorous acid and polyphosphoric acid as in Example XVIII, remain in solution and do not form precipitates as indicated for Example XVI.

EXAMPLE XIX (PRIOR ART)

A 0-12-11 fertilizer having a pH of 6.4 was prepared by mixing the following:
(1) 728 grams water
(2) 140 grams phosphorous acid
(3) 132 grams potassium hydroxide

EXAMPLE XX (PRIOR ART)

A 0-12-11 fertilizer having a pH of 6.2 was prepared by mixing the following:
(1) 701 grams water
(2) 167 grams phosphoric acid
(3) 132 grams potassium hydroxide

EXAMPLE XXI (PRIOR ART)

A 0-12-11 fertilizer having a pH of 6.2 was prepared by mixing the following:
(1) 723 grams water
(2) 145 grams polyphosphoric acid
(3) 132 grams potassium hydroxide

EXAMPLE XXII

A 0-12-11 fertilizer having a pH of 6.3 was prepared by mixing the following:
(1) 714.5 grams water
(2) 70 grams phosphorous acid
(3) 83.5 grams phosphoric acid
(4) 132 grams potassium hydroxide

EXAMPLE XXIII

A 0-12-11 fertilizer having a pH of 6.3 was prepared by mixing the following:
(1) 725.5 grams water
(2) 70 grams phosphorous acid
(3) 72.5 grams polyphosphoric acid
(4) 132 grams potassium hydroxide Experiment 6—Foliar Application Test (7-Day)

The following is a tabular presentation of the fertilizers described in Examples XIX through XXIII:

Composition of Fertilizers in Examples XIX–XXIII:

(all values in grams)

|  | Ex. XIX Prior Art | Ex. XX Prior Art | Ex. XXI Prior Art | Ex. XXII | Ex. XXIII |
|---|---|---|---|---|---|
| Water | 728 | 701 | 723 | 714.5 | 725.5 |
| Potassium hydroxide | 132 | 132 | 132 | 132 | 132 |
| Phosphorous acid | 140 | — | — | 70 | 70 |
| Phosphoric acid | — | 167 | — | 83.5 | — |
| Polyphosphoric acid | — | — | 145 | — | 72.5 |

Fertilizer samples XIX through XXIII were each diluted with 250 times of water. The solutions were then sprayed onto tomato plants at 10 milliliters per plant. Each tomato plant had a height of between 15–20 centimeters prior to receiving the first application of solution. Eight plants were sprayed with each solution and also received 250 milliliters of water, twice daily. One week after the application of the solution, four plants from each treatment were cut at soil level, washed with dilute acid and distilled water and then dried in an oven at 75 degrees C for 24 hours. The dried plants were then analyzed for total phosphorus and potassium. The results are as follows:

EXPERIMENT 6—DRIED PLANT ANALYSIS
(7-Day)

|  | Ex. XIX Prior art | Ex. XX Prior art | Ex. XXI Prior art | Ex. XXII | Ex. XXIII | No Spray |
|---|---|---|---|---|---|---|
| Dry Matter (g/plant) | 5.88 | 6.86 | 5.94 | 6.89 | 6.25 | 6.17 |
| Total P (%) | 0.48 | 0.45 | 0.41 | 0.52 | 0.49 | 0.38 |
| Total K (%) | 1.86 | 1.79 | 1.72 | 1.82 | 1.75 | 1.69 |

Fertilizer examples XIX, XXII and XXIII contain phosphorous acid.

The combination of polyphosphoric acid and phosphorous acid in Example XXIII showed a 2.1% increase in the percent of phosphorus uptake and a 6.3% increase in dry matter over Example XIX.

The combination of phosphoric acid and phosphorous acid in Example XXII showed a 8.3% increase in the percent of phosphorus uptake and a 17.2% increase in dry matter over Example XIX. Fertilizer examples XX and XXII contain phosphoric acid.

The combination of phosphoric acid and phosphorous acid in Example XXII showed a 15.6% increase in the percent of phosphorus uptake and a 0.4% increase in dry matter over Example XX. Fertilizer examples XXI and XXIII have polyphosphoric acid.

The combination of polyphosphoric acid and phosphorous acid in Example XXIII showed a 19.5% increase in the percent of phosphorus uptake and a 5.2% increase in dry matter over Example XXI.

Experiment 7 Foliar Application Test (45-Day)

The remaining four uncut plants from each treatment (Experiment 6) were kept in a greenhouse for a total of 45 days from the date of the first application of the solution. Each plant was watered twice per day (250 milliliters). At that time, they were cut at soil level, washed with dilute acid and distilled water and then dried in an oven at 75C for 24 hours. The dried plants were weighed for dry matter yields and then analyzed for total phosphorus and potassium. The dry matter yields and analysis are shown below:

EXPERIMENT 7—DRIED PLANT ANALYSIS
(45-Day)

|  | Ex. XIX Prior art | Ex. XX Prior art | Ex. XXI Prior art | Ex. XXII | Ex. XXIII | No Spray |
|---|---|---|---|---|---|---|
| Dry Matter (g/plant) | 26.7 | 2.84 | 27.9 | 31.7 | 30.2 | 25.3 |
| Total P (%) | 0.38 | 0.41 | 0.36 | 0.45 | 0.40 | 0.36 |
| Total P (g/plant) | 0.101 | 0.116 | 0.100 | 0.143 | 0.121 | 0.091 |
| Total K (%) | 1.91 | 1.83 | 1.93 | 1.85 | 2.02 | 2.03 |
| Total K (g/plant) | 0.510 | 0.520 | 0.538 | 0.586 | 0.610 | 0.510 |

As in experiment 6, the prior art fertilizers of example XIX and XX will be compared to example XXII and the prior art fertilizers of example XIX and XXI will be compared to example XXIII.

The combination of polyphosphoric acid and phosphorous acid in Example XXIII showed a 19.8% increase in phosphorus uptake and a 13.1% increase in dry matter over Example XIX.

The combination of phosphoric acid and phosphorous acid in Example XXII showed a 41.6% increase in phosphorus uptake and a 18.7% increase in dry matter over Example XIX.

The combination of phosphoric acid and phosphorous acid in Example XXII showed a 23.3% increase in phosphorus uptake and a 11.6% increase in dry matter over Example XX.

The combination of polyphosphoric acid and phosphorous acid in Example XXIII showed a 21.0% increase in phosphorus uptake and a 8.2% increase in dry matter over Example XXI.

The results indicate that combinations of phosphorous acid with either phosphoric acid or polyphosphoric acid can enhance the uptake of phosphorus by plants. The test results also indicate that there is a synergistic effect by the combination of phosphorous acid with either phosphoric acid or phosphorous acid on plant growth.

I claim:

1. A concentrated phosphorus fertilizer formulation consisting essentially of:
   a) a phosphorus containing acid or its salts selected from the group consisting of phosphorous acid, hypophosphorous acid, polyphosphorous acid, polyhypophosphorous acid and salts thereof;
   b) an inorganic complexing agent or salts thereof comprising at least 1% but less than 30% by weight of the concentrated phosphorus fertilizer formulation, said inorganic complexing agent or salts thereof being selected from the group consisting of polyphosphoric acid, dipolyphosphoric acid, tripolyphosphoric acid, tetra polyphosphoric acid, penta polyphosphoric acid, hexapolyphosphoric acid, potassium polyphosphate, ammonium polyphosphate, sodium polyphosphate, zinc polyphosphate, magnesium polyphosphate, and iron polyphosphate; and
   when said concentrated phosphorus fertilizer is diluted with water, a substantially fully soluble fertilizer having an acceptable pH for phosphorus uptake by plants is formed.

2. A method of improving the phosphorus uptake of plants consisting essentially of application of the water diluted concentrated phosphorus fertilizer of claim 1 to plants.

3. A method of improving the growth rate of plants consisting essentially of application of the water diluted concentrated phosphorus fertilizer of claim 1 to plants.

4. The concentrated phosphorus fertilizer of claim 1 wherein when said concentrated phosphorus fertilizer is diluted with water and said substantially fully soluble fertilizer is formed, said substantially fully soluble fertilizer has a pH of about 5.0–7.5.

5. A method of improving the phosphorus uptake of plants consisting essentially of:
   providing an inorganic acid complexing agent or salts thereof selected from the group consisting of polyphosphoric acid, dipolyphosphoric acid, tripolyphosphoric acid, tetra polyphosphoric acid, penta polyphosphoric acid, hexapolyphosphoric acid, potassium polyphosphate, ammonium polyphosphate, sodium polyphosphate, zinc polyphosphate, magnesium polyphosphate, and iron polyphosphate;
   providing a phosphorus containing acid or its salts selected from the group consisting of phosphorous acid, hypophosphorous acid, polyphosphorous acid, polyhypophosphorous acid and salts thereof;
   mixing said inorganic acid complexing agent or salts thereof and said phosphorus containing acid to form a concentrated liquid fertilizer wherein at least 1% but less than 30% by weight of said concentrated liquid fertilizer is the inorganic complexing agent or salts thereof;
   diluting said concentrated liquid fertilizer with water to form a substantially fully soluble fertilizer having a foliage-acceptable pH for phosphorus uptake; and
   applying said diluted fertilizer to said plants.

6. An improved concentrated phosphorus fertilizer consisting essentially of:
   (A) a first phosphorus containing component, selected from the group consisting of phosphorous acid, hypophosphorous acid, polyphosphorous acid, polyhypophosphorous acid, and salts thereof;
   (B) a second phosphorus containing component, selected from the group consisting of phosphoric acid, ammonium phosphate, calcium phosphate, copper phosphate, iron phosphate, magnesium phosphate, manganese phosphate, sodium phosphate, zinc phosphate and polyphosphoric acid and salts thereof;
   the ratio of said first phosphorus component to said second phosphorus component is in the range between one to twenty and twenty to one by weight; said concentrated phosphorus fertilizer being a stable solution; and when said concentrated phosphorus fertilizer is diluted with water, a substantially fully soluble fertilizer is formed having an acceptable pH which is suitable for phosphorus uptake by plants and wherein the combination of said components (A) and (B) improves phosphorus uptake by plants more than if either an equivalent amount of said component (A) or said component (B) were used alone.

7. The improved phosphorus fertilizer of claim 6 wherein said fertilizer, when diluted, has a pH of from about 5.0 to about 7.5.

8. A concentrated phosphorus fertilizer consisting essentially of:
   (A) a first phosphorus component selected from the group consisting of phosphorous acid, hypophosphorous acid, polyphosphorous acid, polyhypophosphorous acid, and salts thereof;
   (B) a second phosphorus component selected from the group consisting of polyphosphoric acid, dipolyphosphoric acid, tripolyphosphoric acid, tetrapolyphosphoric acid, penta polyphosphoric acid, hexapolyphosphoric acid, potassium polyphosphate, ammonium polyphosphate, sodium polyphosphate, zinc polyphosphate, magnesium polyphosphate, and iron polyphosphate;
   the ratio of said first phosphorus component to said second phosphorus component is in the range between one to twenty and twenty to one by weight; said composition being substantially fully water soluble when diluted with water and having an acceptable pH which is suitable for phosphorus uptake by plants and wherein the combination of said components (A) and (B) improves phosphorus uptake by plants more than if either an equivalent amount of said component (A) or said component (B) were used alone.

9. The concentrated phosphorus fertilizer of claim 8 wherein said fertilizer, when diluted with water, has a pH of about 5.0 to 7.5.

10. A concentrated phosphorus fertilizer consisting essentially of:
   (A) a first phosphorus component selected from the group consisting of phosphorous acid, hypophosphorous acid, polyphosphorous acid, polyhypophosphorous acid, and salts thereof;
   (B) a second phosphorus component selected from the group consisting of phosphoric acid, ammonium phosphate, calcium phosphate, copper phosphate, iron phosphate, magnesium phosphate, manganese phosphate, sodium phosphate and zinc phosphate, the ratio of said first phosphorus component to said second phosphorus component is in the range between one to twenty and twenty to one by weight; said composition being substantially fully water soluble when diluted with water and having a foliage-acceptable pH and wherein the combination of said components (A) and (B) improves phosphorus uptake by plants more than if either an equivalent amount of said component (A) or said component (B) were used alone.

11. The concentrated phosphorus fertilizer of claim 10 wherein said fertilizer, when diluted with water, has a pH of about 5.0 to 7.5.

12. A method of improving plant growth comprising feeding plants a water diluted concentrated phosphorus containing fertilizer consisting essentially of:
   (A) a first phosphorus containing component, selected from the group consisting of phosphorous acid, hypophosphorous acid, polyphosphorous acid, polyhypophosphorous acid, and salts thereof;
   (B) a second phosphorus containing component, selected from the group consisting of phosphoric acid, ammonium phosphate, calcium phosphate, copper phosphate, iron phosphate, magnesium phosphate, manganese phosphate, sodium phosphate, zinc phosphate and polyphosphoric acid and salts thereof;
   the ratio of said first phosphorus component to said second phosphorus component is in the range between one to twenty and twenty to one by weight; said concentrated phosphorus fertilizer being a stable solution; and when said concentrated phosphorus fertilizer is diluted with water, a substantially fully soluble fertilizer is formed having an acceptable pH which is suitable for phosphorus uptake by plants and wherein the combination of said components (A) and (B) improves phosphorus uptake by plants more than if either an equivalent amount of said component (A) or said component (B) were used alone.

13. A method of improving plant growth comprising feeding plants a water diluted concentrated phosphorus containing fertilizer comprising:
   (A) a first phosphorus containing component, selected from the group consisting of phosphorous acid, hypophosphorous acid, polyphosphorous acid, polyhypophosphorous acid, and salts thereof;
   (B) a second phosphorus containing component, selected from the group consisting of phosphoric acid, ammonium phosphate, calcium phosphate, copper phosphate, iron phosphate, magnesium phosphate, manganese phosphate, sodium phosphate, zinc phosphate and polyphosphoric acid and salts thereof;
   the ratio of said first phosphorus component to said second phosphorus component is in the range between one to ten and ten to one by weight; said concentrated phosphorus fertilizer being a stable solution; and when said concentrated phosphorus fertilizer is diluted with water, a substantially fully soluble fertilizer is formed having an acceptable pH which is suitable for phosphorus uptake by plants and wherein the combination of said components (A) and (B) improves phosphorus uptake by plants more than if either an equivalent amount of said component (A) or said component (B) were used alone.

\* \* \* \* \*